United States Patent
Rago

(10) Patent No.: US 6,463,819 B1
(45) Date of Patent: Oct. 15, 2002

(54) UNINTERRUPTIBLE OIL SUPPLY SYSTEM

(75) Inventor: Giusseppe Rago, Mississauga (CA)

(73) Assignee: Pratt & Whitney Canada Corp., Longueuil (CA)

(*) Notice: Subject to any disclaimer, the term of this patent is extended or adjusted under 35 U.S.C. 154(b) by 51 days.

(21) Appl. No.: 09/694,266

(22) Filed: Oct. 24, 2000

(51) Int. Cl.$^7$ .......................... F01M 3/00; F01M 11/08; G05D 11/00

(52) U.S. Cl. ........................ 74/6.2; 74/6.23; 137/112; 137/115.26

(58) Field of Search ................ 184/6.23, 6.2, 184/55.1, 57; 137/112, 115.26

(56) References Cited

U.S. PATENT DOCUMENTS

| | | | |
|---|---|---|---|
| 1,674,103 | 6/1928 | Frederick | 184/6.2 |
| 2,239,098 | 4/1941 | Hunter | 137/38 |
| 2,245,198 | 6/1941 | Hunter et al. | 137/38 |
| 2,312,495 | 3/1943 | Soucek | 137/38 |
| 2,379,579 | 7/1945 | Hunter | 184/6.13 |
| 2,725,956 | 12/1955 | Cunningham | 184/6.23 |
| 2,800,975 | 7/1957 | Carroll, Jr. et al. | 96/187 |
| 2,831,490 | 4/1958 | Simcock | 137/38 |
| 2,933,095 | 4/1960 | Rumsey | 137/38 |
| 2,934,077 | 4/1960 | Whiting | 137/38 |
| 2,942,610 | 6/1960 | Klank et al. | 137/43 |
| 2,942,611 | 6/1960 | Klank, Jr. et al. | 137/43 |
| 2,983,331 | 5/1961 | Helsley, Jr. | 96/212 |
| 3,011,504 | 12/1961 | Klank, Jr. | 137/45 |
| 3,016,912 | 1/1962 | Klank, Jr. et al. | 137/43 |
| 3,180,345 | 4/1965 | Klank, Jr. | 137/43 |
| 4,019,527 | * 4/1977 | Brand | 137/115.26 |
| 4,117,907 | 10/1978 | Lechler | 184/6.2 |
| 4,153,141 | 5/1979 | Methlie | 184/6.2 |
| 4,252,140 | 2/1981 | Hildebrandt | 137/38 |
| 4,511,016 | * 4/1985 | Doell | 184/6.11 |
| 4,531,358 | 7/1985 | Smith | 60/39.08 |
| 4,556,077 | * 12/1985 | Peyton | 137/112 |
| 4,793,440 | * 12/1988 | Iseman | 184/6.23 |
| 4,899,773 | 2/1990 | Harrison | 137/1 |
| 4,947,963 | 8/1990 | Aho, Jr. | 184/6 |
| 4,962,829 | * 10/1990 | Sugden | 184/6.23 |
| 5,141,179 | 8/1992 | Gautier | 244/135 R |
| 5,836,421 | * 11/1998 | Leicht | 184/6.2 |

FOREIGN PATENT DOCUMENTS

FR          2756255          5/1998

* cited by examiner

Primary Examiner—David A. Bucci
Assistant Examiner—Justin Stefanon

(57) ABSTRACT

An oil supply system supplies oil under pressure to a bearing or journal enclosure during normal positive gravity conditions as well as negative gravity and zero gravity conditions. A closed oil storage tank containing a volume of oil below a gas filled headspace with primary drain in a bottom portion normally supplies a pressure pump which passes a pressure control valve before entering an inlet of the enclosure. In negative gravity or zero gravity conditions oil is absent from the tank bottom and the primary pressure pump is starved of oil. The invention solves this problem with an auxiliary tank outlet disposed above the bottom drain (at the top and/or sides of the tank) and the oil-air separator separates the air before pumping the oil under pressure to the bearing or journal enclosure past a directional switch. The directional control switch (1) connects the switch oil inlet to the switch oil return outlet and oil tank when oil pressure delivered by the pressure pump exceeds a predetermined minimum threshold pressure; and (2) connects the switch inlet to the oil supply outlet and enclosure when oil pressure delivered by the pressure pump is less than the threshold pressure.

7 Claims, 4 Drawing Sheets

UNINTERRUPTIBLE OIL SUPPLY SYSTEM

TECHNICAL FIELD

The invention relates to an uninterruptible oil supply system where oil is supplied from an oil storage tank during negative and zero gravity conditions with a minimum of additional components and existing equipment modification.

BACKGROUND OF THE ART

The invention described below relates to an oil supply system generally for an aircraft gas turbine engine that provides an uninterrupted supply of pressurised oil to the engine journal chambers for engine bearing chambers during any inverted flight, negative gravity, zero gravity or aerobatic manoeuvres of the aircraft.

In addition to military aircraft or acrobatic aircraft, which experience reversals of gravity during flight manoeuvres, a continuous supply of oil is required under all conditions in many commercial aircraft, especially those that incorporate journals rather than bearings. Roller bearings or thrust bearings generally have a greater capacity to self lubricate when oil supply is interrupted. The centrifugal force and rotational movement of components serves to create a vacuum and distribute oil during minor interruptions. On the other hand due to low cost and ease of manufacture, many critical rotating components are supported on journals consisting of oil impregnated bronze or brass sleeves, rather than roller bearings. Oil supply to journals is extremely critical oil is essential in avoiding excessive friction and heating. Lack of oil supplied to journals for less than one second will often completely destroy the journals and adjacent gearbox. For this reason, the present invention and many examples in the prior art have been proposed to guarantee an uninterrupted oil supply during all anticipated flight conditions.

Many different prior art systems have been designed to address the problem of oil starvation in the bearing or journal chambers when an aircraft experiences negative or zero gravity. Under normal flying conditions with the aircraft positioned in an upright attitude, oil within the oil tank falls under gravity towards a drain positioned at the bottom of the oil tank. A conventional oil supply system includes a pressure pump, which withdraws the oil from the tank and delivers it usually through a pressure regulating valve to the bearing or journal chamber. In the bearing or journal chamber oil spray nozzles or oil supply channels distribute oil to the moving parts to lubricate moving parts and absorb heat for cooling the parts. The centrifugal motion of the moving components scatters the oil to the outer periphery where it is gathered up in a scoop and withdrawn under vacuum by a scavenge pump. The scavenge pump conducts the return oil through an oil-air separator which removes air usually in a centrifugal manner. The regenerated oil is then returned to the oil tank for re-circulation.

Common air oil separators utilise centrifugal force to separate the oil and air due to the difference in density between the oil and air. Heavier oil is forced outwardly and the lighter air is vented from a central vortex area from the oil-air separator. An additional feature of most oil-air separators is the additional capacity to act as a pump, due to the energy imparted to the oil during the centrifugal movement of the oil.

Therefore in the prior art it is well recognised that the provision of an uninterrupted oil supply is essential to avoid the possibility of bearing failure, overheating and fire risk, or journal seizing.

Many prior art systems for providing uninterrupted oil supply are based on providing baffles or chambers within the oil tank itself to maintain a small reservoir of oil immediately adjacent the pump inlet during inverted flights. Understandably such systems have a limited reservoir capacity and therefore inverted flight or zero gravity can only be accommodated for a short period of time.

Further prior art systems relate to movement of the pump inlet and vents with rotating pendulums for example within the oil tank to ensure that the pump inlet and oil within the tank are in constant contact. These complex mechanical systems add substantially to the weight of the oil supply system. As experienced with any moving mechanical component, a pendulum within the oil tank involves the risk of malfunction and imposes the necessity of preventive maintenance. The above prior art systems have facilitated a limited degree of aerobatic manoeuvring but have not enabled aircraft to remain in orientations other than normal level flight for any significant length of time. Zero gravity or high gravity manoeuvres remain a challenge for these types of systems.

Further prior art systems provide multiple inlets within the oil tank itself, for example at the top, bottom and sides, all feeding towards a common valve. The valve itself utilises various gravity controlled plugs to open and close the alternative valve seats within the valve and ensure that oil is withdrawn from the corner of the tank where oil is forced and directed to the primary pressure pump. These systems are not completely reliable in that they depend on the physical movement of weighted components under the force of gravity of components valve mechanism itself. There is an inherent time delay in the movement of oil which may or may not be accurately matched by the time delay in the movement of the weighted valve plugs. Mechanical failure, jamming due to debris or clogging of the valve can prevent proper operation. Due to the extreme sensitivity of journals especially, these systems are not reliable enough for use in modern aircraft. The reliance on gravity motion to open and close the valve does not provide the degree of accuracy necessary for split second control of the oil supply system.

Examples of prior art gravity controlled ball valves are provided in U.S. Pat. No. 2,239,098 to Hunter, U.S. Pat. No. 2,312,495 to Soucek and U.S. Pat. No. 2,831,490 to Simcock. Examples of oil tank pendulum orientation systems are shown in U.S. Pat. No. 2,379,579 to Hunter, U.S. Pat. No. 2,800,975 to Carroll et al. and U.S. Pat. No. 3,011,504 to Klank Jr. U.S. Pat. No. 2,983,331 to Helsley Jr. shows an example of an oil tank with a cyclone oil-air separator and internal baffles to ensure adequate oil supply during inverted flight.

Taking a different approach however, U.S. Pat. No. 4,531,358 to Smith recognises that the breather or oil-air separator of the oil supply system can function under certain circumstances as an auxiliary oil pump. During inverted flight Smith provides that oil is drained from the bearing cavities towards the breather where air is removed. Absence of oil pressure in the primary oil delivery system provided by the pressure pump, results in passage of pressurised oil from the oil-air separator/breather past a check valve into the oil delivery conduits to the bearings.

A significant disadvantage however of the system described in U.S. Pat. No. 4,531,358 to Smith is that the oil trapped within the oil tank is not utilised during inverted flight or zero gravity. In effect the oil-air separator is used as an auxiliary pump to completely by-pass the oil tank. Oil scavenged from the bearing chambers is merely recirculated in a sub-section of the oil distribution circuit. Scavenged oil is directed through the breather, air is removed and the oil is directed back to the bearings by-passing the oil tank.

During relatively long periods of negative or zero gravity, the Smith oil system will reuse the oil circulating in the sub-section of the supply system many times and the oil reservoir trapped in the tank will remain unused. If such a system is used for a limited period of time the functioning of the oil system will be adequate provided there is no significant leakage or loss of oil. However, for extended periods of time the recirculated oil may overheat or accumulate a high concentration of debris thereby overtaxing the cooling system and filtering system of the oil circuit.

It is an object of the invention to provide an uninterrupted oil supply during inverted flight, negative gravity or zero gravity of substantially identical quality and quantity to the oil supply delivered during normal flight.

It is a further object of the invention to provide an uninterrupted oil supply system using existing equipment and with a minimal degree of additional circuitry valves and modification.

It is a further object of the invention to provide uninterrupted oil supply with a minimal additional weight, mechanical complexity, assembly cost and maintenance cost.

It is a further object of the invention to rationalise the multiple valves and control systems of prior art uninterrupted oil systems thereby resulting in lower manufacturing costs and maintenance requirements for the oil system.

Further objects of the invention will be apparent from review of the disclosure, drawings and description of the invention below.

DISCLOSURE OF THE INVENTION

The oil supply system according to the invention supplies oil under pressure to a bearing or journal enclosure during normal positive gravity conditions as well as negative gravity and zero gravity conditions.

A closed oil storage tank containing a volume of oil below a gas filled headspace with primary drain in a bottom portion normally supplies a pressure pump which passes a pressure control valve before entering an inlet of the enclosure.

An oil-air separator accepts return oil from the enclosure outlet via a scavenge pump, then separates and vents the air before returning the oil to the storage tank.

In negative gravity or zero gravity conditions oil is absent from the tank bottom and the primary pressure pump is starved of oil. The invention solves this problem with an auxiliary tank outlet disposed above the bottom drain (at the top and/or sides of the tank) and the oil-air separator serves as an auxiliary pump that also separates the air from oil before pumping the oil under pressure to the bearing or journal enclosure past a directional switch.

The directional control switch (1) connects the switch oil inlet to the switch oil return outlet and oil tank when oil pressure delivered by the pressure pump exceeds a predetermined minimum threshold pressure; and (2) connects the switch inlet to the oil supply outlet and enclosure when oil pressure delivered by the pressure pump is less than the threshold pressure.

The invention provides significant advantage over the prior art systems described above and in particular the system described in U.S. Pat. No. 4,531,358 to Smith. As mentioned above, Smith merely re-circulates oil recovered from the bearing chamber utilising the breather or oil-air separator as an auxiliary pump during zero and negative gravity conditions. The Smith system re-circulates the same oil and by-passes the large reservoir of oil retained in the oil tank during negative and zero gravity conditions. Any significant leakage or oil loss will rapidly deplete the oil supply in the Smith system. Whereas the Smith system re-circulates a small percentage of the oil continuously during negative and zero gravity conditions, the present invention has access the entire volume of oil thereby avoiding the risk of rapid leakage loss, or overloading of the oil filtering and heat exchanging systems.

A significant advantage of the present invention is the simplicity of the uninterrupted oil system. Existing equipment is utilised with minor modifications and minimal additional weight, mechanical complexity, additional conduits, valves and other components resulting in only a marginal increase in the manufacturing complexity, costs of manufacture and maintenance demands.

When compared to the system provided by U.S. Pat. No. 4,531,358 to Smith, the present invention rationalises the multiple valves and pressure control systems in a single valve with a single moving valve plug. Significant advantages result from use of a single valve such as avoidance of troubleshooting of multiple valves, minimising manufacturing and maintenance costs and enabling the valve, pressure pump and air-oil separator to be packaged within a compact unit that can be removed from service and replaced easily to avoid significant downtime for the aircraft during troubleshooting and maintenance.

Further advantages of the invention will be apparent from the following detailed description and accompanying drawings.

DESCRIPTION OF THE DRAWING

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
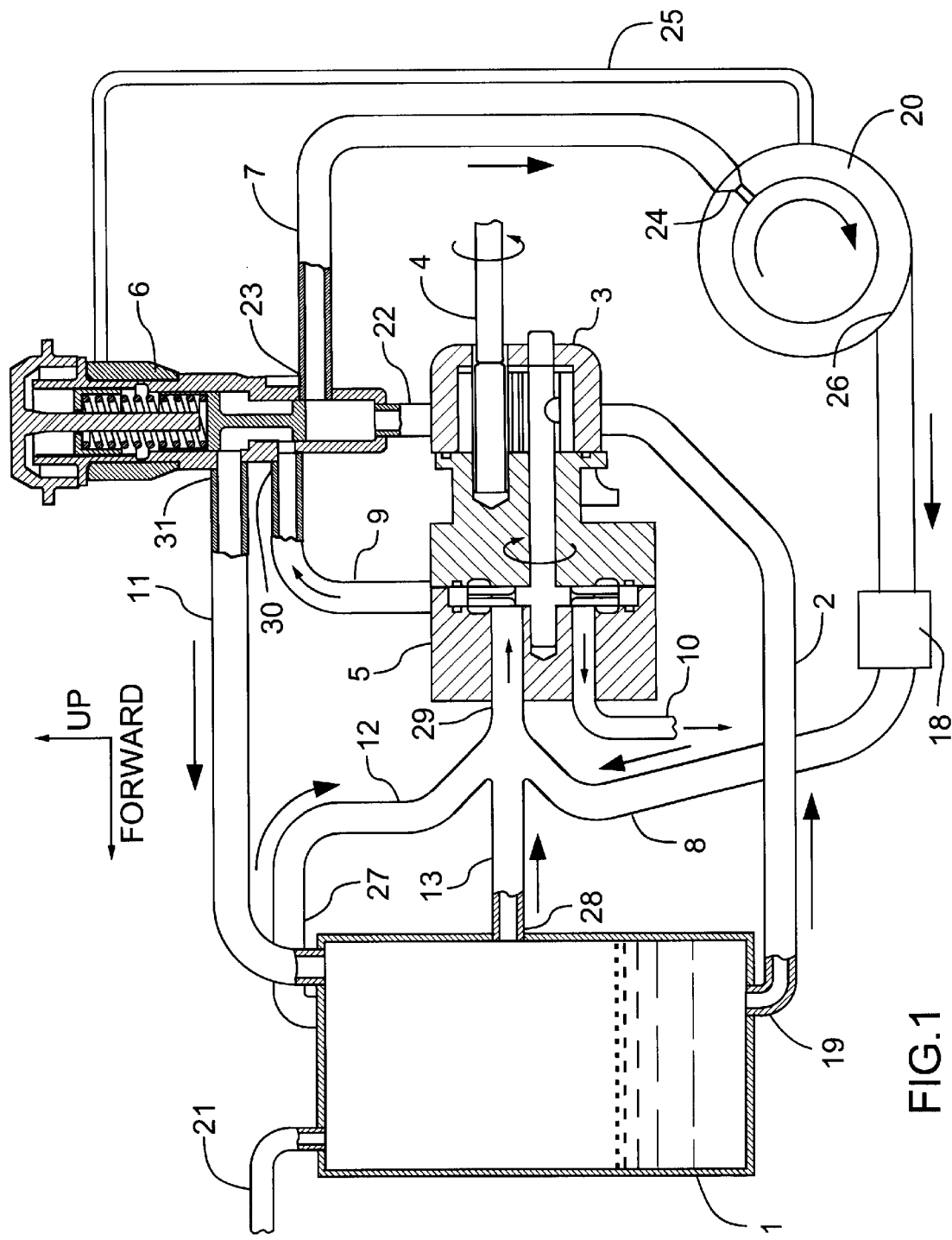
FIG. 1 is a schematic view of the uninterruptible oil supply system of the invention shown providing oil from a storage tank under pressure to journals, including primary pressure pump, recuperative oil-air separating pump, and valve serving as a pressure regulator, and pressure controlled switch between primary and auxiliary pressurised oil sources.

FIG. 1 illustrates a schematic view of the uninterruptible oil supply system provided by the invention. As drawn, FIG. 1 shows the normal flying attitude of the aircraft in the up position. However, it will be understood by those skilled in the art that during negative gravity or inverted flight the oil within the oil tank 1 will be forced upward as drawn towards the top of the tank 1. During zero gravity flight the volume of oil may float within the centre portion of the tank 1. In both cases however, the drain 19 in the bottom portion of the tank will be deprived of oil supply.

In the description that follows, the normal operation during positive gravity flight will be described first. Thereafter the novel features of the invention to provide uninterrupted oil supply during negative gravity and zero gravity flight conditions will be described in detail.

The oil supply system in FIG. 1 generally circulates oil between a closed oil storage tank 1 and a journal or bearing enclosure 20 for lubrication and cooling purposes. Not shown in the schematic view are a heat exchanger and an oil filter usually included in oil circulation systems. The storage tank 1 contains a volume of oil, that under the force of positive gravity is usually located in the bottom portion of the tank. The return oil conduit 11 redelivers the oil to the oil tank 1 and the oil volume within the tank 1 usually includes a gas filled headspace above the oil which may or may not be combined with foam as the air escapes from the retained oil stored in the tank 1. The gas filled headspace in the tank 1 is exposed to atmospheric pressure via the tank vent 21. Depending on the altitude of the aircraft, the air pressure within the tank 1 and the journal enclosure 20 varies considerably during flight and air pressure changes must be accommodated by the oil supply system.

The tank 1 has a primary drain 19 located in a bottom portion of the tank 1 that under normal positive gravity flying conditions supplies a pressure pump 3 with oil through a pump inlet communicating with conduit 2 and drain 19. The oil pressure pump 3 is rotated on a common shaft 4 with the oil-air separator 5. Both are driven by the auxiliary gearbox of the aircraft engine (not shown).

A single unitary valve 6 is provided in accordance with a preferred embodiment of the invention as will be described in detail below. The valve inlet 36 communicates with the pressure pump outlet via conduit 22. Under normal flying conditions the pressure of oil delivered by the pressure pump 3 is sufficient to maintain the valve 6 in an open condition. In the open condition shown in FIG. 2, oil is conducted through the pressure regulating valve 6 through the oil supply outlet 23 in communication with an inlet of the journal enclosure 20 via conduit 7.

As mentioned above, the journal enclosure 20 is exposed to atmospheric air pressure. In order to ensure a constant supply of pressurised oil, the difference in pressure between the oil supply to the oil jet 24 and the surrounding atmosphere must be maintained at a predetermined level. Otherwise, relative oil pressure would increase as the aircraft altitude increases. Therefore to monitor the atmospheric air pressure a conduit 25 is fed back to the valve 6 to monitor air pressure within the journal enclosure 20 in a manner which will be described in detail below.

The rotation of moving parts within the journal enclosure 20 circulates the oil from the jet 24. Eventually the oil is propelled radially outwardly against the walls of the journal enclosure 20 by the centrifugal force of the rotating parts. Residual oil from the enclosure 20 is collected by a scoop 26 and conveyed under vacuum through the scavenge pump 18 and scavenge conduit 8 to the inlet of the oil-air separator 5.

The oil-air separator 5 may take the form of various prior art recuperative pumps or breathers. The primary function of the oil-air separator 5 is to separate air from the oil-air mixture withdrawn from the enclosure 20. Air is then vented out the air outlet 10 and generally dumped overboard. The regenerated oil is conducted through the oil outlet of the oil-air separator 5 and conduit 9.

Figure 2:
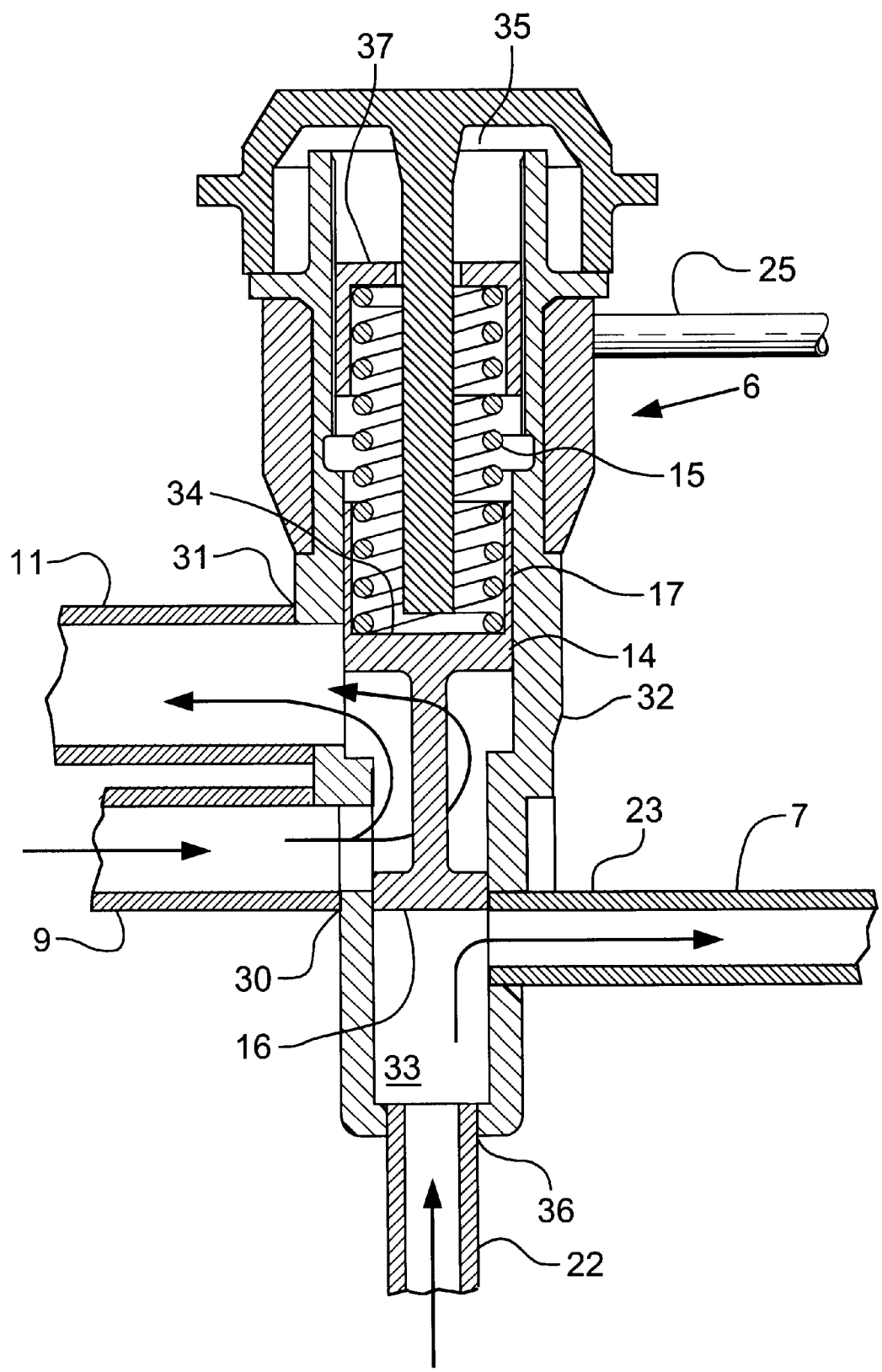
FIG. 2 is an axial sectional view through the valve showing the position of the spool shaped valve plug and resultant oil flow condition during normal upright positive gravity operation.

With reference with FIG. 2, during normal upright positive gravity flight, the regenerated oil flowing from conduit 9 merely passes through the valve 6 as indicated in FIG. 2 and returns to the oil tank 1 via return conduit 11.

As will be apparent to those skilled in the art, the regenerative pump or oil-air separator 5 also has the capacity to pump oil under pressure out the oil outlet into conduit 9. Common types of oil-air separators 5 utilise centrifugal impellers or rotating components to cast the higher density oil radially outward under centrifugal force. Air is separated from the centre of a vortex created within the oil-air separator. The oil with air removed is drawn from the exterior of oil-air separator where it is forced under centrifugal action. As a result of the centrifugal force applied to the oil by the impeller of the oil-air separator 5, the pressure of the oil is increased. As in prior art systems, this pressure increase is used to conduct the oil from the separator 5 back to the oil storage tank 1.

The invention differs significantly from the prior art however in the following manner. Since during negative gravity conditions the volume of oil within the tank 1 is forced towards the top of the tank 1, and during zero gravity conditions the oil volume is maintained floating within the central portion of the tank 1, the drain 19 and oil pressure pump 3 are deprived of oil supply. To remedy this condition the invention provides at least one auxiliary tank outlet disposed above the drain 19.

In the embodiment illustrated a top tank outlet 27 withdraws oil from the extreme top portion of the tank via conduit 12. A central portion of the tank 1 is evacuated via central tank outlet 28 that feeds midway conduit 13. The midway conduit 13 may be attached at the rear-side portion of the tank 1 as illustrated or any other lateral side portion including the front-side portion of the tank. The outlets 27, 28 may also be located within the tank 1 as in prior art systems to vacuum oil from various locations inside the tank 1. The top tank outlet 27 withdraws oil generally during negative gravity conditions where the bulk of the oil volume is forced upwardly within the tank 1. During zero gravity conditions where the oil is floating in the central portion of the tank 1, the central tank outlet 28 evacuates oil via the midway conduit 13.

However, it will b e apparent that since conduits 12 and 13 are fed via an auxiliary inlet 29 to the oil-air separator 5, any mixture of air and oil can be readily accommodated. For example, if oil foam or pure air is evacuated via the conduits 12 and 13 during normal positive gravity flight, the oil-air separator 5 functioning normally can separate the oil and air from each other and return any oil via conduits 9 and 11. However, during negative or zero gravity flight pure oil is withdrawn from the tank through conduits 12 and 13 when the drain 19 is deprived of oil.

Figure 3:
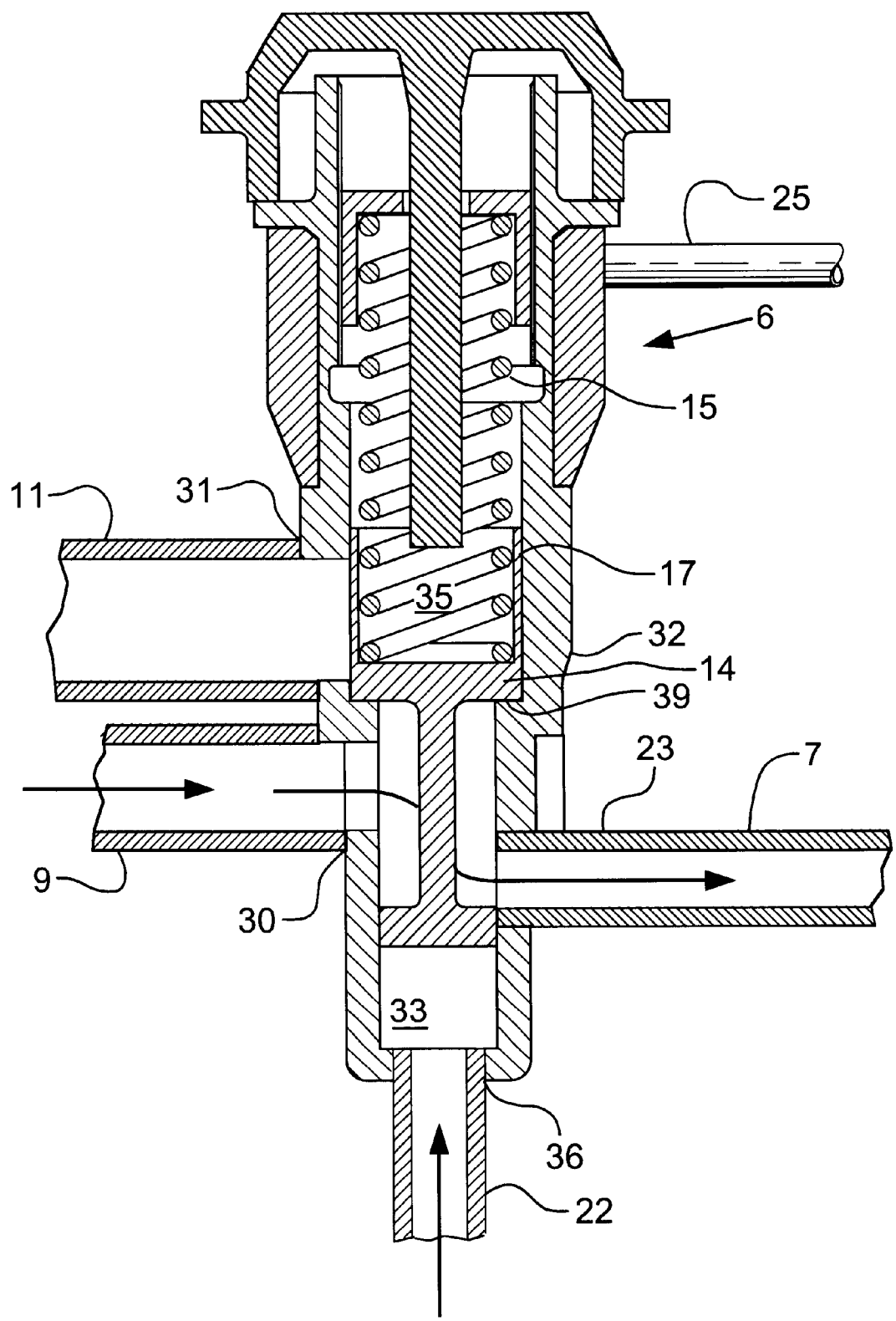
FIG. 3 is a like axial sectional view showing the plug position and oil flow during negative or zero gravity conditions.
Figure 4:
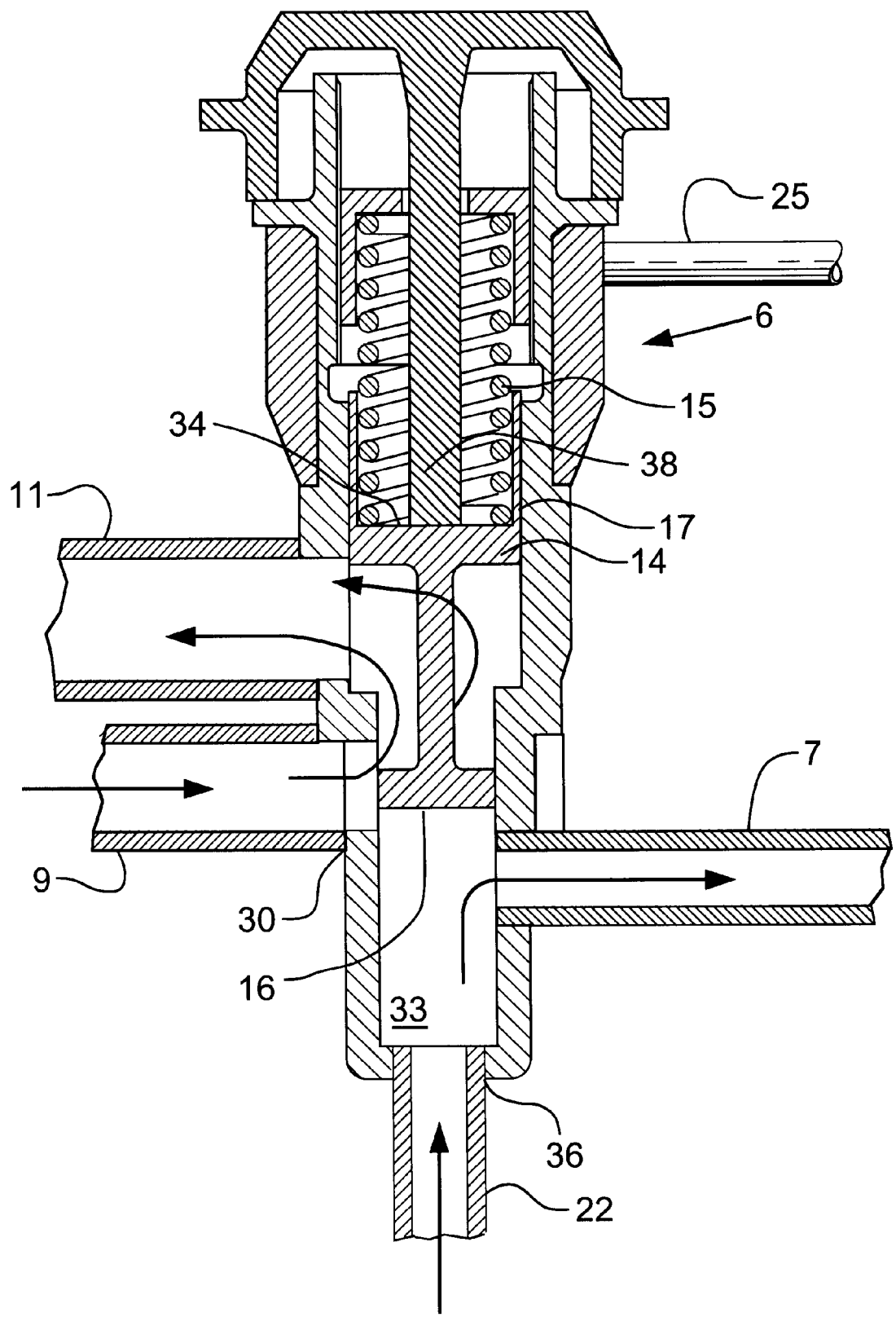
FIG. 4 is a like axial sectional view showing the plug position and oil flow during positive gravity conditions and where excess oil pressure from the primary pressure pump is relieved through upward movement of the valve plug.

The unitary valve 6 therefore serves multiple functions. The valve 6 regulates the oil pressure delivered from the oil pressure pump 3. Excess pressure is relieved to avoid overpressure at the jet 24 as indicated in FIG. 4. When insufficient oil pressure is delivered from the oil pressure pump 3, the regulating function serves to shut off oil flow from the oil pressure pump 3 as shown in FIG. 3.

The unitary valve 6 serves as a directional switch with switch inlet 30 in communication with the oil outlet of the separator 5. The directional switch includes a return outlet 31 in communication with the tank return inlet via return conduit 11. As well the directional switch includes an oil supply outlet 23 which communicates with the journal enclosure 20 via conduit 7.

The directional switch element of the valve 6 connects the switch inlet 30 to the switch return outlet 31 when oil pressure delivered by the pressure pump 3 exceeds a predetermined minimum threshold pressure. However, the switch also connects the switch inlet 30 to the oil supply outlet 23 when oil pressure delivered by the pressure pump 3 is less than the threshold pressure required.

To summarise therefore when the pressure pump 3 provides sufficient pressure to the valve 6, oil conducted through conduit 22 passes through the valve 6 then to conduit 7 and the oil jet 24 within the enclosure 20. At the same time the returned oil passing from the oil-air separator 5 passes through conduit 9 into switch inlet 30, exits through return outlet 31 to conduit 11 and is returned to the tank 1.

When insufficient pressure is delivered from pressure pump 3, the valve 6 prevents flow between conduits 22 and 7. However, regenerated oil flow is enabled between switch inlet 30 and oil supply outlet 23. As a result, during negative or zero gravity conditions, oil is withdrawn from the tank via conduits 12 and 13 into the oil-air separator 5 by the vacuum force created by the separator 5. Oil then progresses under pressure through conduit 9, past switch inlet 30 and out oil supply outlet 23 to conduit 7 and oil jet 24. A significant advantage of the invention is that the entire volume of oil within the system is available to be recirculated during negative and zero gravity conditions.

FIGS. 2, 3 and 4 show the details of the operation of a unitary valve 6 which incorporates the primary pressure valve functions and directional switch functions in a simple unified component.

Referring to FIG. 2, the unitary housing 32 retains a moveable plug 14 having a first end 16 defining a primary oil pressure chamber 33. A second opposing end 34 defines a control gas pressure chamber 35. The lateral surfaces of the plug 14 (including skirt 17) co-act with the interior of the housing 32 to contain pressurised oil within chamber 33 and contain control gas within chamber 35. Due to the viscosity of oil, it is not considered necessary to seal the lateral edges of the plug 14 with o-rings or sliding seals. Any small amount of leakage between chambers is not critical and the close fitting plug 14 serves without o-ring seals or other means to separate the various flows of oil and air.

The primary oil pressure chamber 33 has a valve inlet 36 that communicates via conduit 22 with the outlet of the pressure pump 3. In the normal operating condition under positive gravity, the primary oil pressure chamber 33 also communicates with the oil supply outlet 23 to supply air via conduit 7 to the inlet of the journal enclosure 20.

The plug 14 is biased to a closed position by spring 15. The compressive force of the spring 15 can be adjusted by relocating an externally threaded collar 37. Atmospheric air pressure within the journal enclosure 20 is detected via air filled conduit 25, which communicates with the control gas pressure chamber 35. As a result the plug 14 serves to monitor the relative oil pressure or absolute difference between oil pressure within the primary oil pressure chamber 33 and gas pressure within the control gas pressure chamber 35.

FIG. 2 shows the open position of the plug 14 when the difference between oil pressure in chamber 33 and gas pressure within chamber 35 is greater than the predetermined minimum threshold pressure.

With reference to FIG. 4, the plug 14 also serves to regulate maximum oil relative pressure within chamber 33 as indicated. Excess pressure forces the spring 15 upwardly and excess oil pressure is relieved as oil bleeds past the first end 16 and returns to the oil tank via conduit 11 as indicated by arrows in FIG. 4. The upward motion of the plug 14 is limited by physical contact between the second end 34 and centre post stop 38 extending within the gas pressure chamber 35.

With reference to FIG. 3, the closed position of the plug 14 is shown. The spring 15 biases the plug 14 to a closed position against the resistance of oil pressure within the oil chamber 33. When the difference between the oil pressure within the primary oil pressure chamber 33 and the gas pressure within control gas pressure chamber 35 is less than the predetermined minimum threshold pressure, the plug 14 is moved downwardly to the position shown in FIG. 3.

The interaction between the plug 14 and limiting shoulder 39 serves to limit the downward motion of the plug 14. As shown in FIG. 3 therefore, the absence of sufficient pressure differential within the oil chamber 33 forces the plug 14 downwardly and the passage of oil between the valve inlet 36 and the oil supply outlet 23 is impeded. In the open position shown in FIG. 2, oil is permitted to flow between the inlet 36 and the outlet 23 due to the supply of adequate oil pressure within the chamber 33.

In the embodiment shown in all drawings, the plug 14 has a spool shape with reduced diameter portion within the middle of the lateral surfaces thereby providing a switch passage serving to change the direction of flow originating from the switch inlet 30. The switch passage in the open position shown in FIG. 2 communicates between the switch inlet 30 and the oil return outlet 31 when the plug 14 is in the open position. Referring to FIG. 3, the switch passage also serves to communicate between the switch inlet 30 and the oil supply outlet 23 when the plug 14 is moved to the closed position. The lateral surface of the plug 14 also includes a skirt 17, which impedes oil flow to the oil return outlet 31 when the plug 14 is in the closed position.

To recap the operation, during normal positive gravity flight, all within the oil tank 1 is retained in the bottom portion of the tank 1 and can be withdrawn to the pressure pump 3 via bottom drain 19 and conduit 2. Oil under pressure is delivered via conduit 22 to the valve inlet 36 and pressurises primary oil pressure chamber 33. When sufficient oil pressure is delivered to the chamber 33, the plug 14 is forced upwardly against the force of spring 15 and against the pressure of gas within chamber 35 to maintain the open position shown in FIG. 2. In the open position of the plug 14, oil is permitted to flow between the valve inlet 36 and the oil supply outlet 23. In addition, oil returned from the oil-air separator 5 is permitted to flow through the switch passage between the switch inlet 30 and the return outlet 31 back to the oil tank 1. Under positive gravity conditions oil delivered to conduit 7 passes through the journal enclosure 20 and is recovered via scavenge pump 18 returned to the oil-air separator 5 past through the unitary valve switch 6 and conduit 11 back to the oil tank 1.

Under zero or negative gravity conditions the oil within the oil tank 1 is forced upwardly to the top of the tank 1 or floats within the central portion of the oil tank 1. The primary pressure pump 3 is deprived of oil since oil is absent from the vicinity of the drain 19. As a result the pressure of oil contained within the primary oil pressure chamber 33 of the valve 6 rapidly drops. The plug 14 is forced against the oil pressure within chamber 33 by the spring 15 to the closed position shown in FIG. 3. Oil from the top of the tank 1 is withdrawn through top tank outlet 27 and conduit 12 into the oil-air separator 5. Oil located within the central portion of the tank 1 is withdrawn through central tank outlet 28 and conduit 13 also by the regenerative pump or oil-air separator 5. At the same time oil from the journal enclosure 20 continues to be withdrawn via scavenge pump 18 through conduit 8 into the oil-air separator 5. The combined flows from conduits 12, 13 and 8 enter the oil-air separator 5 and oil is separated from air. The air is vented through air outlet 10 and the oil under pressure is delivered via conduit 9 to the switch inlet 30. With reference to FIG. 3, oil is conducted from conduit 9 when the plug 14 is in the closed position shown to the oil supply outlet 23 and journal enclosure 20 via conduit 7.

When normal flight conditions return and oil is again forced under gravity to the bottom portion of the tank 1, the pressure pump 3 is able to withdraw oil via the drain 19 and increases pressure within the chamber 33 to the point where the plug 14 is forced to the open position shown in FIG. 2.

A significant advantage of the invention is the rationalisation of all control valve functions within a unitary valve 6. The valve 6 monitors oil pressure and atmospheric pressure within the journal enclosure 20. The valve 6 as shown in FIG. 4 serves to regulate oil pressure by venting excess pressure back to the tank 1. In addition, the valve 6 serves as a switch to select between open and closed position shown in FIGS. 2 and 3 respectively.

It will be apparent to those skilled in the art that the pressure pump 3, valve 6 and oil-air separator 5 can be conveniently packaged together in a single unit. Malfunction of the oil system can be addressed simply by removing the combined unit from the engine and replacing with a reconditioned or new unit. Downtime as a result of oil system malfunction is significantly reduced.

The invention accommodates negative and zero gravity conditions without introduction of complex control mechanisms, mechanical valves that rely on gravity to open and close, or multiple valves and additional conduits as proposed in the prior art.

Although the above description relates to a specific preferred embodiment as presently contemplated by the inventor, it will be understood that the invention in its broad aspect includes mechanical and functional equivalents of the elements described herein.

I claim:

1. An oil supply system for supplying oil under pressure to an enclosure, the system comprising:

a closed oil storage tank containing a volume of oil below a gas filled headspace, the tank having a primary drain in a bottom portion;

a pressure pump having: a pump inlet communicating with the tank drain; and a pump outlet;

an oil-air separator with: an inlet communicating with an enclosure outlet; an air outlet venting separated air; and an oil outlet;

an auxiliary tank outlet disposed above the drain;

the oil-air separator having an auxiliary inlet communicating with the auxiliary tank outlet; and a unitary valve and directional switch having: a primary oil inlet communicating with the pressure pump outlet; a gas pressure inlet communicating with gas within the enclosure; an auxiliary oil inlet in communication with the oil outlet of the separator; an oil return outlet in communication with an oil tank return inlet; and an oil supply outlet in communication with the enclosure, the unitary valve and directional switch: connecting the switch auxiliary oil inlet to the switch oil return outlet when oil pressure, relative to gas pressure in the enclosure, delivered by the pressure pump exceeds a predetermined minimum threshold pressure differential; and connecting the switch auxiliary oil inlet to the oil supply outlet when oil pressure, relative to gas pressure in the enclosure, delivered by the pressure pump is less than the threshold pressure differential.

2. An oil supply system according to claim 1 wherein the auxiliary tank outlet has a location selected from the group consisting of: a top portion of the tank; a central portion of the tank; a rear side portion of the tank; a lateral side portion of the tank; and a front side portion of the tank.

3. An oil supply system according to claim 1 wherein said unitary valve and directional switch comprises:

a unitary housing having a movable plug with a first end defining a primary oil pressure chamber, an opposing second end defining a control gas pressure chamber, and lateral surface co-acting with an interior of the housing to contain pressurised oil and control gas in said chambers;

the primary oil pressure chamber communicating with the primary oil inlet that communicates with the pressure pump outlet and with the oil supply outlet communicating with the enclosure inlet;

the plug being biased to a closed position wherein oil passage between the primary oil inlet and oil supply outlet is impeded when the difference between oil pressure within the primary oil pressure chamber and gas pressure in the control gas pressure chamber is less than said predetermined minimum threshold pressure differential, and moved to an open position when the difference between oil pressure within the primary oil pressure chamber and gas pressure in the control gas pressure chamber exceeds said predetermined minimum threshold pressure differential; and the plug including a switch passage in said lateral surface, the switch passage communicating between the switch auxiliary oil inlet and the oil return outlet when the plug is in the open position, and communicating between the switch auxiliary oil inlet and the oil supply outlet when the plug is in the closed position.

4. An oil supply system according to claim 3 wherein the lateral surface of said plug impedes oil flow to the oil return outlet when in the closed position.

5. An oil supply system according to claim 1 wherein the the unitary valve and directional switch connects the primary oil inlet to the switch oil return outlet when oil pressure, relative to gas pressure in the enclosure, delivered by the pressure pump exceeds a predetermined maximum operating pressure differential.

6. An oil supply system according to claim 5 wherein the unitary directional switch includes a plug travel limit stop.

7. An oil supply system according to claim 1 wherein the oil pressure pump and the oil-air separator are driven by a common shaft.

* * * * *